United States Patent [19]
Penn et al.

[11] 3,952,172
[45] Apr. 20, 1976

[54] TELEPHONE CALL SIMULATOR

[75] Inventors: Corentin Jean Louis Penn, Pleumeur-Bodou; Paul Jean Castex, Lannion; André Tarridec, Perros-Guirec, all of France

[73] Assignee: SOCOTEL, a Societe Mixte pour le Developpement de la Technique de la Commutation dans le Domaine des Telecommunications, Issy-les-Moulineaux, France

[22] Filed: Apr. 18, 1974

[21] Appl. No.: 461,954

[30] Foreign Application Priority Data
May 2, 1973 France .............................. 73.16397

[52] U.S. Cl. .......................................... 179/175.2 R
[51] Int. Cl.[2] ............................................ H04M 3/24
[58] Field of Search .............. 179/175.2 R, 175.2 D, 179/175.2 C; 340/172.5

[56] References Cited
UNITED STATES PATENTS

| | | |
|---|---|---|
| 3,497,639 | 2/1970 | Malinich et al. ............. 179/175.2 R |
| 3,692,961 | 9/1972 | Le Strat et al. ............... 179/175.2 R |
| 3,692,962 | 9/1972 | Raczynski et al. ............ 179/175.2 R |
| 3,840,712 | 10/1974 | Oberer et al. ................. 179/175.2 R |

*Primary Examiner*—Douglas W. Olms
*Attorney, Agent, or Firm*—Laff, Whitesel & Rockman

[57] ABSTRACT

A telephone simulator includes a plurality of pseudo subscriber circuits connected to subscriber lines. A plurality of pseudo junctors are connected to trunk lines. A number of detector circuits respond to line conditions, tones, circuit operations, data processing, and the like. A data processor uses these equipments to check incoming and outgoing calls to and from a public telephone network.

3 Claims, 5 Drawing Figures

TELEPHONE CALL SIMULATOR

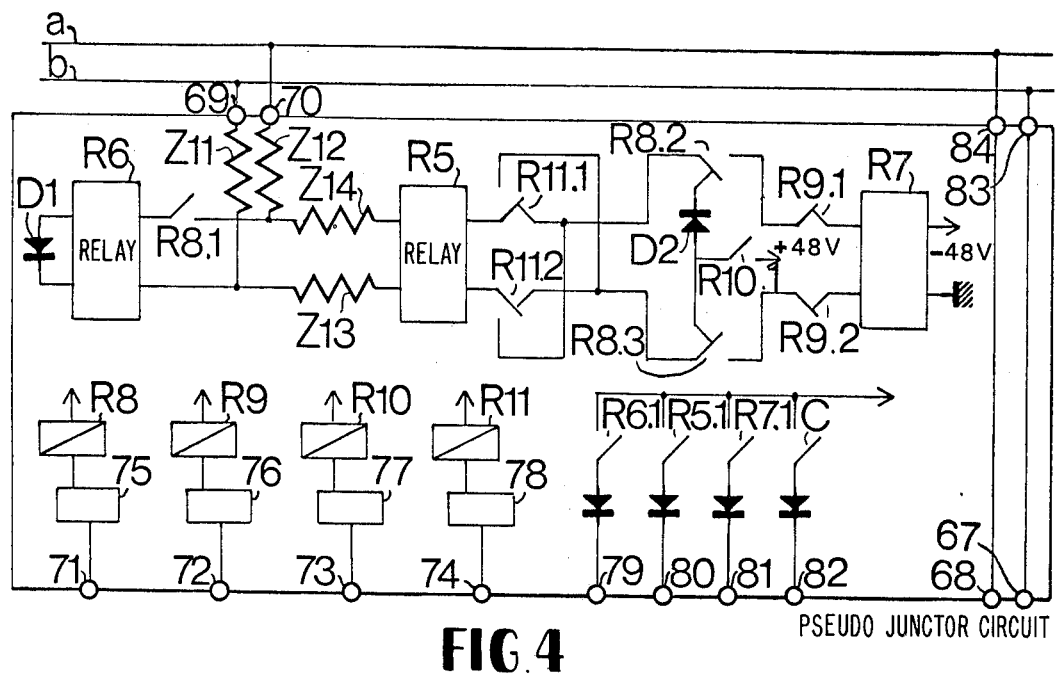
FIG. 4  PSEUDO JUNCTOR CIRCUIT
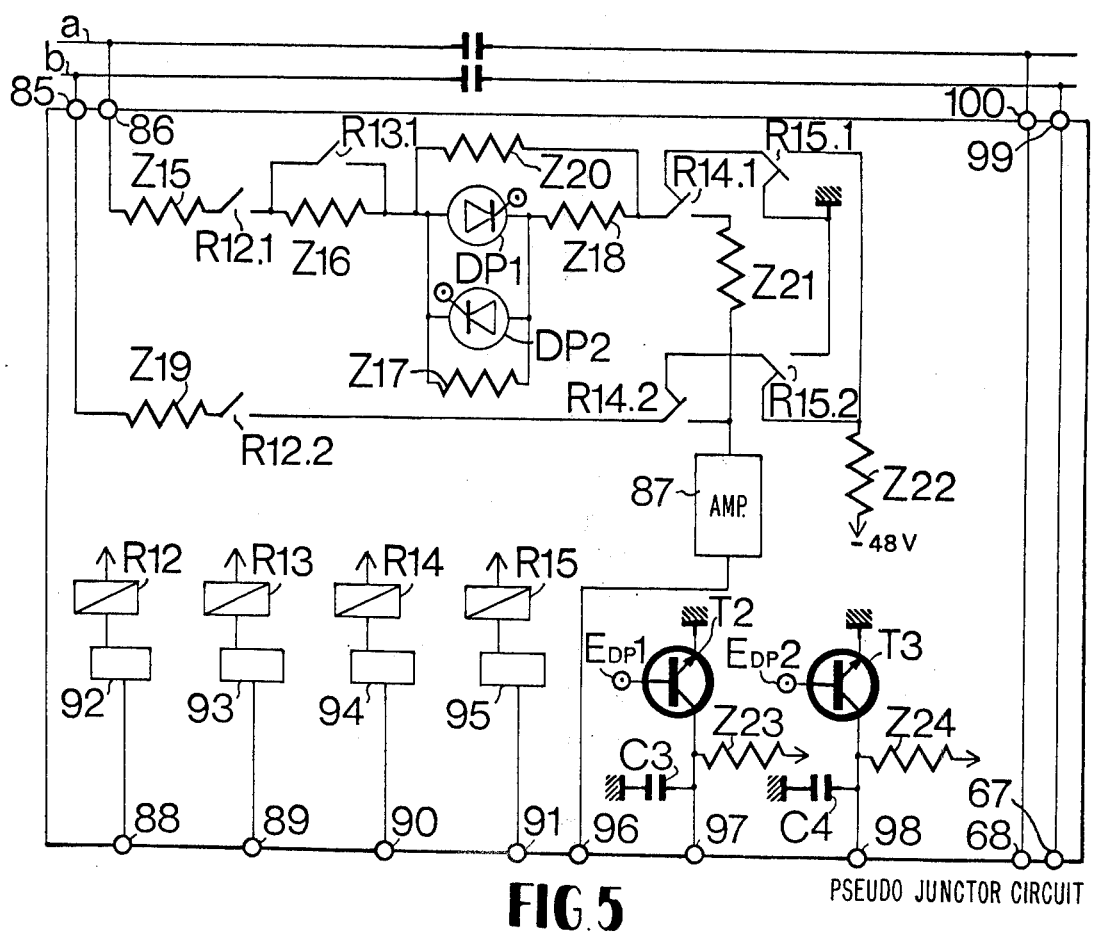
FIG. 5  PSEUDO JUNCTOR CIRCUIT

TELEPHONE CALL SIMULATOR

The present invention relates to a device for controlling the operation of an automatic telephone exchange by simulating calls.

For a long time test calls have been utilized as a simple testing method for controlling the operation of a telephone exchange. In order to render these tests more efficient, the trend is to originate a number of simultaneous test calls, which means that several calls are processed at the same time even when they have been not originated at the same time and are being in different steps of establishment. A device for originating simultaneous test calls is for instance described in the French Patent No. 1,273,458. However, the device described in that French Patent is only able to to place a small number of simultaneous test calls, about ten. But, such a small number of test calls does not suffice to test the efficiency and reliability of a telephone exchange. Indeed, if it is desired to increase the number of simultaneous test calls (up to 50 or 100) to better simulate traffic in at least a portion of an exchange, the testing device must be provided with data processing means such as a computer.

The French Patent 2,068,046 (U.S. Pat. No. 3,692,961) describes a call simulator capable (by way of example) of making up to 50 simultaneous test calls, the simulator being controlled by a stored program computer. Such a simulator comprises a plurality of pseudo subscriber circuits respectively connected to a plurality of test lines connected to the distribution frame of the tested telephone exchange, line condition detectors, tone detectors, line condition generators, tone generators, an order distributor capable of temporarily connecting either a detector or a generator to a test line, or of causing condition changes in a pseudo subscriber circuit, a scanner capable of temporarily transmitting signals having been detected by a detector, and a data processing unit capable of controlling the order distributor and of receiving and processing signals transmitted from the scanner.

More particularly that data processing unit is a stored program digital computer. The unit comprises a direct access electronic memory including a plurality of cells rigidly allotted to test lines. Each each cell stores the directory number of the associated test line and is capable of storing, for each test call, relation data (function A for calling line or function R for called line, and the address of the cell associated with the line to be connected through the tested exchange). During the establishment of each call, the cell receives information concerning the call step conditions (call step, step duration, etc.). The data processing unit comprises an internal cyclic scanner for sequentially scanning memory cells at the same time that the associated test lines are reached by the distributor or the external scanner. Its own processing and controlling circuit processes data stored in scanned cells and signals transmitted from the external scanner concerning associated test lines. This processing circuit sends appropriate orders concerning the same test lines to the distributor, and for writing new step condition data into both scanned cells and cells associated therewith. In addition, the data processing unit comprises selection means for selecting different idle test lines, for placing new test calls and for writing relation data into corresponding memory cells, initiating means for initiating calls on test lines for which memory cells have received relation data, and storing means for storing test results (number of initiated tests, number of successful tests, final steps of unsuccessful tests, etc.).

An embodiment of the call simulator described in the French Patent No. 2,068,046 (U.S. Pat. No. 3,692,961) relates to the case of test lines associated to their pseudo subscriber circuits which are grouped in groups of eight test lines, generators and detectors associated to each group being in number less than eight and being selectively connectable to a test line through a coupling field, the connection being switched for a variable duration according to the nature of the generator or detector.

However, the call simulator described in the French Patent No. 2,068,046 relates only to local call simulation. It can only be used to check telephone exchange circuits utilized in local call, that is preselection stages, registers, local junctors, selection stages, transmission of local tones and ringing currents.

An article entitled "Computer testing of exchanges during installation", published in the Review "Electrical Communication", vol. 46, no 3, 1971, pages 191–195, suggests to also check toll calls, but described no specific means in this respect. The French Patent No. 1,539,840 also describes a system for testing the operation of a private exchange as well as ingoing and outgoing calls, but does not describe specific circuits to do so.

A purpose of the present invention is to provide a call simulator comprising means for particularly checking outgoing calls from a telephone exchange to the public toll network as well as ingoing calls from public toll network, the remote local exchange involved in the call either being in the same numbering area or in another numbering area. The invention is also capable of checking the transit calls.

More particularly, another purpose of this invention is to provide a call simulator comprising means for checking the operations of outgoing junctors and ingoing junctors in an exchange, as well as those circuits which are employed to process toll calls within a telephone exchange.

Furthermore, it is known that, in a typical telephone network, due to the successive generations of the installed switching systems, numerous types of junctors are needed to transmit various types of signalling.

Therefore, another purpose of this invention is to provide a test call simulator having a modular structure. The various modules correspond to the various types of junctors and to the signallings to be checked. The fit the simulator onto new types of junctors it is only necessary to replace suitably modules and load a suitable program into the data processing unit.

According to a feature of this invention, there is provided a telephone call simulator comprising pseudo subscriber circuits respectively connected to telephone exchange subscriber lines, pseudo junctors respectively connected to telephone exchange trunk lines, line condition detectors, tone detectors, line condition generators, tone generators, order distributors, scanners and a data processing unit. The pseudo junctors comprises, on the one hand, wires which prolong the wires of the trunk line, to which the associated pseudo junctor is connected, to the said tone detectors. The order distributors are connected to the pseudo junctor under control of data processing unit. On the other hand, signalling detection circuits and signalling transmission circuits, which are proper to the signalling system of the said trunk line, the said signalling detection circuit are connected scanners. The signalling transmission circuits are directly connected to said order distributors. According to another feature, there is provided a telephone call simulator wherein there are various types of pseudo junctors which are grouped in modules. Each module comprises one type of pseudo junctor. Each pseudo junctor has various functions, such as either calling or called functions, signalling using pulses at 50 Hz or TRON-RON Wires, or loop condition changes, but at the same operation time, any pseudo junctor in a group having the same function.

According to a further feature, there is provided a telephone call simulator. When signalling transmitted on trunk line is slaved multifrequency signalling, certain tone generators and certain tone detectors are assembled together to form multifrequency signallers.

Other features of the present invention will appear more clearly from the following description of an embodiment, the said description being made in conjunction with the accompanying drawings, wherein:

FIG. 4 is the schematic diagram of a pseudo junctor circuit capable of processing loop condition change signalling; and FIG. 5 is the schematic diagram of a pseudo junctor circuit capable of processing both condition change signalling and multifrequency signalling.

Figure 1:
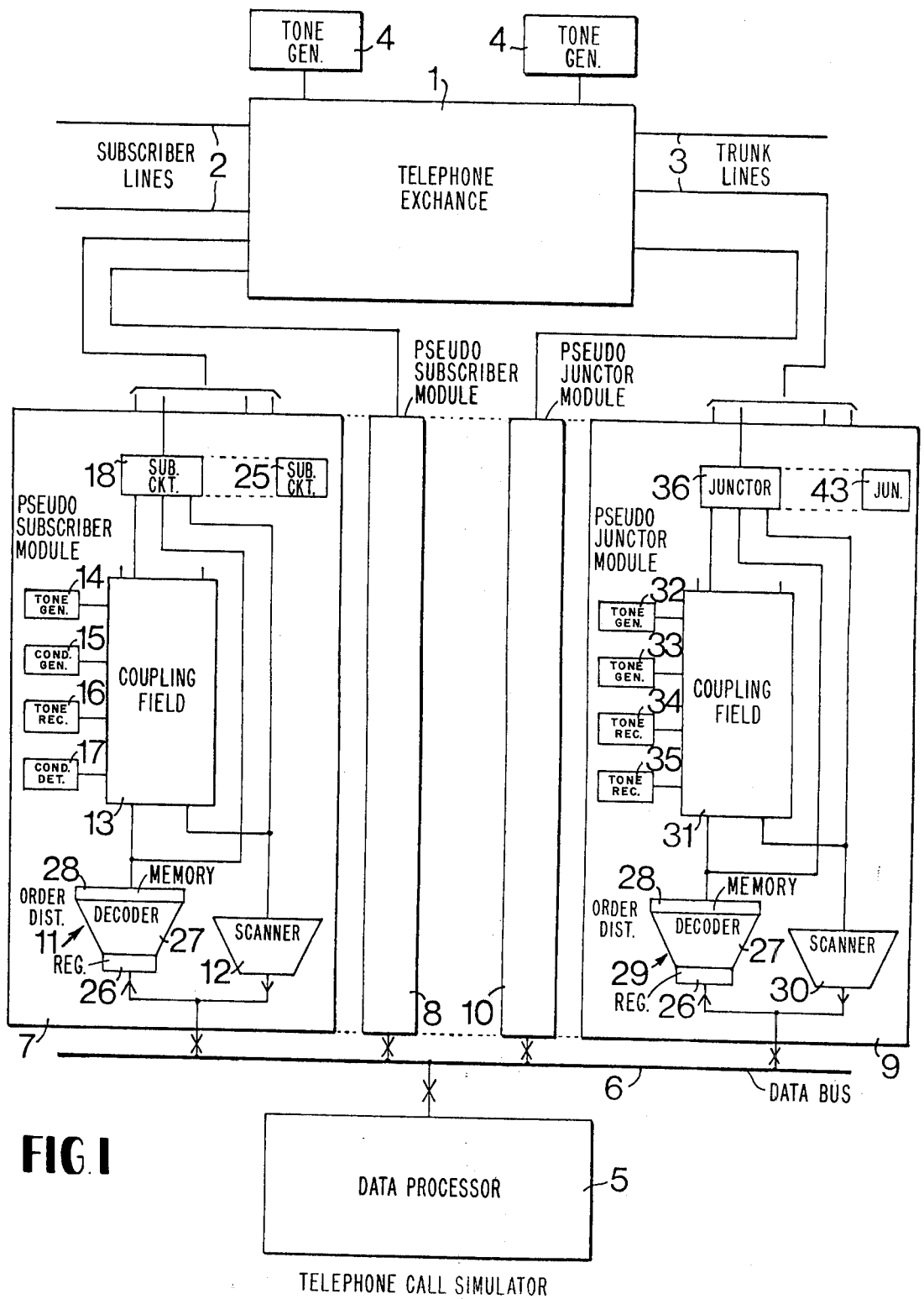
FIG. 1 is the general block diagram of a telephone call simulator according to this invention.

The telephone call simulator shown in FIG. 1 is more particularly intended for performing calls between subscribers and toll network. Those calls are either ingoing calls or outgoing calls, and it is connected to a telephone exchange including subscriber lines. It will be further explained that changes needed for fitting the simulator to transit call tests are small in number and in importance.

In FIG. 1 the telephone exchange the operation of which must be checked, is succinctly shown in the upper part of the drawing and the simulator according to this invention in the under part thereof. The telephone exchange 1 comprises preselection and selection stages, control devices and a distribution frame which subscriber lines 2 and trunk lines 3 are connected to. In addition exchange 1 comprises tone generators such as 4. Trunk lines 3 also include junctors, not shown.

The call simulator comprises a data processing unit 5 connected to a bus line 6 for transfering data to and from peripherals. Bus 6 may connect, in a conventional manner, unit 5 to pseudo subscriber circuit modules, such as 7 or 8, and to pseudo junctor circuit modules, such as 9 or 10.

Pseudo subscriber circuit module 7 comprises an order distributor 11, a scanner 12, a coupling field 13, tone generators, such as 14, condition generators, such as 15, tone receivers, such as 16 and condition detectors, such as 17, and pseudo subscriber circuits 18–25. Each circuit 18–25 is connected to exchange 1 through lines similar to subscriber lines 2. Distributor 11 comprises an order register 26, a decoder 27 and a plurality of flip-flops 28 operating as order memories.

Pseudo junctor circuit module 9 comprises an order distributor 29, a scanner 30, a coupling field 31, tone generators, such as 32 and 33, tone receivers, such as 34 and 35, and pseudo junctor circuits or simpler pseudo junctors 36–43. Each pseudo junctor 36–43 is connected to exchange 1 through lines similar to trunk lines 3. Distributor 29 comprises as 12, an order register 26, a decoder 27 and a plurality of flip-flops 28 operating as order memories, the capacity of each of those items being possibly different from the capacity of the corresponding item in 11.

When multifrequency signalling is employed certain generator 32 are combined with receivers 34 to constitute multifrequency signalling devices capable of receiving and transmitting multifrequency codes and more particularly slaved multifrequency codes. Such a signalling device has been particularly described in the French Patent Application 72 23 909 entitled "Signaleur multifréquence et notamment son récepteur de signalisation" and filed on June 27, 1972.

In a typical embodiment of the simulator shown in FIG. 1 comprises 8-pseudo subscriber modules, each comprising 8-pseudo subscriber circuits. There are also 8-pseudo junctor modules, each comprising 8-pseudo junctors. Thus, the simulator makes it possible to establish, in certain conditions, up to 64 simultaneous calls, each call involving a pseudo subscriber circuit and a pseudo junctor connected through exchange 1. Obviously, another modular distribution might be selected, and the number of modules may vary according to processing power and speed of unit 5. Obviously, in each module, the number of generators and detectors is less than the number of pseudo subscriber circuits or pseudo junctors and coupling fields 13 and 31, which operate on a time shared or a time division basis. To be noted, in telephone exchanges using multifrequency or MF signalling, the maximum number of simultaneous calls is limited to the number of MF signalling devices installed in the simulator.

Figure 2:
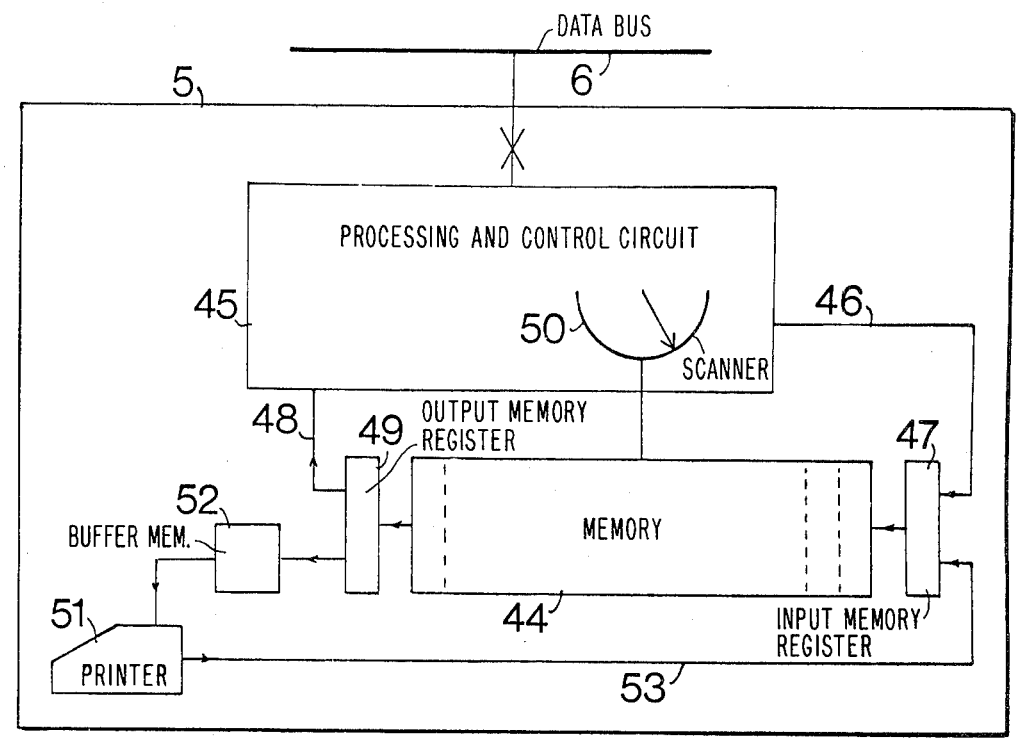
FIG. 2 is the particular block diagram of data processing unit 5 of the simulator shown in FIG. 1.

FIG. 2 shows a data processing unit 5 which basically comprises a memory 44 wherein each cell is allotted either to a pseudo subscriber circuit or a pseudo junctor, and a processing and control circuit 45. Circuit 45 communicates with modules 7–10 through bus 6. Circuit 45 is also connected to memory 44 by write wires 46 connected to input memory register 47 and by read wires 48 connected from output memory register 49. A scanner 50 addresses circuit 45 to the memory cells, which are located in memory 44, in the same order as pseudo subscriber circuits or pseudo junctors respectively.

Scanner 50 has a continuous cyclic operation. Each portion of a cycle is allotted to a module, wherein order distributor 11 or 29 and scanner 12 or 30, respectively, operate in synchronism with scanner 50 during the corresponding portion of the cycle. Thus, at each time of a cycle, circuit 45 is connected to a pseudo subscriber circuit or a pseudo junctor through bus 6 and the associated distributor 11 or 29, and the associated scanner 12 or 30, respectively, as well as to a cell of memory 44 through scanner 50. A scanning cycle period may, for instance, be of about 4-ms, so that with a device comprising 8-pseudo subscriber modules and 8-pseudo junctor modules, each pseudo subscriber circuit or pseudo junctor is, together with its associated cell, processed in about 40 microseconds, as an average. To be noted, the operation to be processed in a cell is a timing operation which consists, in a conventional manner, in adding a bit in a specific register provided in the cell. The cell processing may have a shorter duration. Conversely, when the operation consists of writing new information such a step change, due to an outside event, for instance in a module, the cell processing may be of a substantially longer duration.

In addition, memory 44 is connected to a printing machine 51 operating as a conventional computer peripheral. Output register 49 is connected to printer 51 through a buffer memory 52. Output of 51 is connected to input register 47, via wires 53, but this link is only operated at the beginning of a test to write succinct initial conditions into memory 44.

The operation of processing unit 5, shown in FIG. 2, is very similar to operation described in the already mentioned French Patent 2,068,046 (U.S. Pat. No. 3,692,961). In the following, reference will be made to such an operation in specific cases only. However it will be recalled that each cell in memory 44 can contain the following data:

— Directory number allotted to line 2 associated with a pseudo subscriber circuit or identification number of a trunk line 3 (such a number remains written in the cell as long as it is not changed through printing machine 51); trunk line identification number includes its equipment number and the number of the trunk direction including the trunk line.

— Relation data: function A (calling line or calling trunk line) or function R (called line or called trunk line) and address of either the subscriber line or trunk line cell which is being associated therewith for the duration of a test. In the case of an ingoing call, the address of either the associated line or trunk is stored before the call is initiated. In the case of an outgoing call the address of either the associated line or trunk is written during the call establishment since the trunk line, which will be selected by the exchange is among the trunks of the called direction processing an outgoing call initiated from a subscriber line, the address is not known in advance. By way of example, it may be agreed for determining such an address for an outgoing call that the first digits of the called number determine the direction. The two last digits or the tenth and unit digits identify the calling party line. Then having received the called number, the called pseudo junctor cell establishes that address and transmits the reciprocal address to the associated cell.

— Condition data: successive steps of a test call and possible portions of those steps (such data are varied in the course of a test call).

— Various timing data are and reccurence data utilized within certain test call steps (such data are conventionally counted in number of scanning cycles or in number of reccurence and then counted down to zero or to the occurence of the expected event).

It is also recalled that a pseudo subscriber circuit may simply comprise a contact or a set of contacts which simulates the set of switchhook contacts in a subscriber set, a capacitor shunting the contact and a serially connected resistor which simulate the subscriber set impedance.

Conversely junctor functions are more complex. Therefore, next to be described are several embodiments of pseudo junctors.

Figure 3:
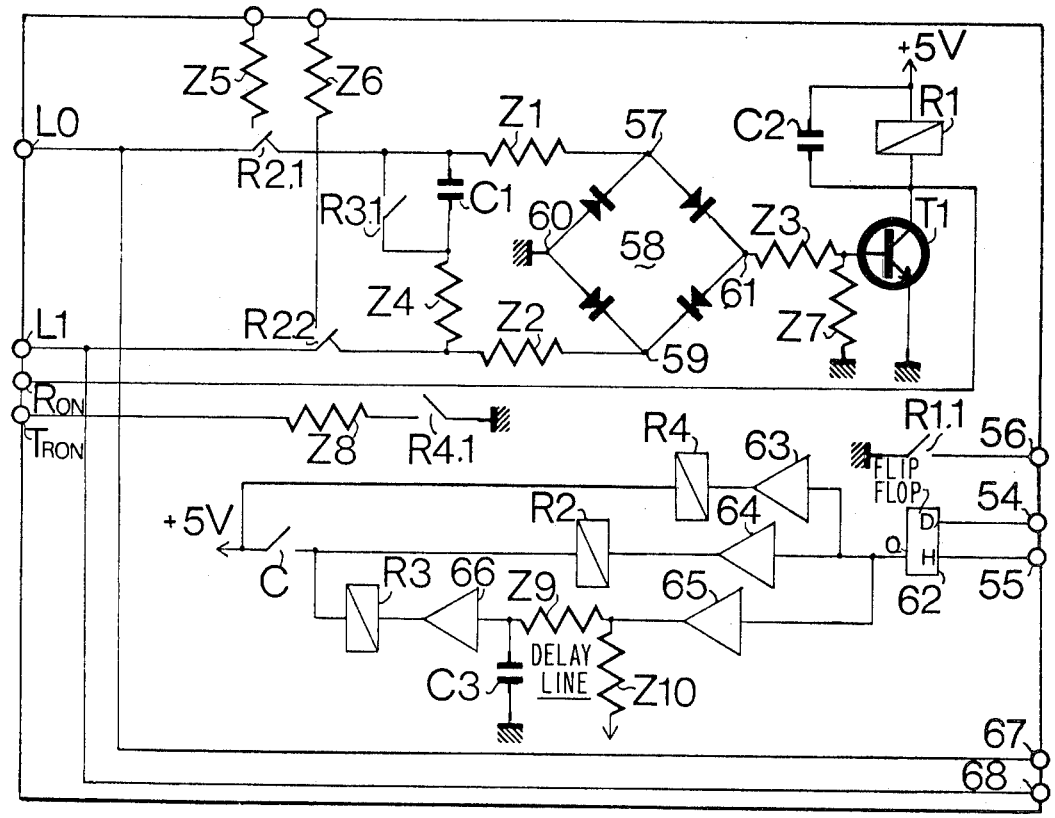
FIG. 3 is the schematic diagram of a pseudo junctor circuit capable of processing pulse signalling.

FIG. 3 is the schematic diagram of a pseudo junctor capable of communicating with an actual junctor operating according to the signalling system, called SRCT R6/SOCOTEL S1 as it has been defined in French PTT specifications. The pseudo junctor shown in FIG. 3 comprises two terminals L0 and L1 as well as two terminals TRON and RON to be connected to corresponding wires L0, L1 and possibly to wires TRON and RON of a test trunk line 3. In addition, it comprises two terminals 54 and 55 connected to distributor 29 in the module including the concerned pseudo junctor. Finally, it comprises a terminal 56 which may be connected via 31 to the scanner 30 in the same module.

Terminal L0 is connected through resting contact of reversing switch R2.1 to the first end of resistor Z1 (680 ohms). The second end of resistor Z1 is connected to junction point 57 of a diode bridge rectifier 58. Terminal L1 is connected through resting contact of reversing switch R2.2 to the first end of resistor Z2 (680 ohms). The second of resistor Z2 is connected to junction point 59 of diode bridge 58. The other bridge junction points 60 and 61 in the second diagonal of bridge 58 are respectively connected to ground and to the base of transistor T1 through resistor Z3. The first end of resistor Z1 is also connected to the first end of resistor Z2 through a circuit comprising capacitor C1 (2.2 $\mu$F) and resistor Z4 (560 ohms). C1 capacitor may possibly be shunted by make contact R3.1. Make contacts of reversing switches R2.1 and R2.2 are connected to the two terminals of an AC generator at 50 Hz, 100 V, via two resistors Z5 and Z6 (each being of 560 ohms). The base of transistor T1 is biased by resistor Z7 connected to groud. The NPN transistor T1 has its emitter grounded and its collector connected to a winding of electromechanical relay R1 connected on the other side to a +5V voltage source. Relay R1 is shunted by capacitor C2 (10 $\mu$F).

Terminal RON is directly connected to junction point between collector of T1 and relay R1. Terminal TRON is grounded via resistor Z8 and make contact R4.1 which are serially connected together. Resistor Z8 (of 1 kilohm) may be short-circuited depending on controlled trunk line 3.

Terminal 54 is connected to input D of flip-flop 62 while terminal 55 is connected to input H thereof. Output Q of flip-flop 62 is parallel connected to inputs of three amplifiers 63–65. The output of amplifier 63 is connected to the winding of relay R4 which is on the other side connected to a +5V voltage source. The output of amplifier 64 is connected to the winding of relay R2 which is on the other side connected to source of + 5 V via control key C shown in open condition in FIG. 3. The output of amplifier 65 is connected via a delay line to an input of amplifier 66 which has its output connected to the winding of relay R3 which is on the other side connected to a source of +5 V, also via key C. The delay line comprises serially connected resistor Z9 (100ohms) which has its first end grounded via capacitor C3 (4.7 $\mu$F) and its second end grounded via resistor Z10 (100 kilohms). Terminal 56 is grounded via make contact R1.1.

In case of signalling transmitted on wires TRON-RON, key C is open. Relay R1 is then directly controlled by the condition of terminal RON. Then, in reception condition, contact R1.1 of relay R1 recopies the condition of wire RON, transmitted toward scanner 30. In transmission condition, relay R4 is directly controlled by the condition of flip-flop 62, that is by orders from dstributor 29. Contact R4.1 of relay R4 controls the condition of wire TRON.

In the case of signalling at 50 Hz, key C is closed and relay R4 remains controlled by flip-flop 62 which has no influence, because wires TRON and RON are not prolonged. In reception condition, relays R2 and R3 are at rest and an AC voltage applied from L0 and L1 is rectified by bridge 58 whose output controls the condition of transistor T1 which supplies relay R1. Relay R1 has its conditions recopied by contacts R1.1, transmitted toward scanner 30. In transmission condition, relays R2 and R3 are both operated by flip-flop 62 which receives orders from distributor 29. Contacts R2.1 and R2.2 connect source at 50 Hz to terminals L0 and L1 while contacts R3.1 shunte capacitor C1. The release of relay R3 is delayed by delay line C3, Z9 and Z10 which makes it possible to discharge the trunk line connected to L0, L1 on Z4. Pulses at 50 Hz obviously have well defined meanings depending on the signalling step and on their duration. Those meanings are described in the French PTT specification.

Furthermore, the pseudo junctor shown in FIG. 3 comprises two output terminals 67 and 68 respectively connected to parallel to terminals L0 and L1. Terminals 67 and 68 may be connected either to tone generator 32 or 33, or to tone receiver 34 or 35 the connection being controlled by distributor 29. Thus, once the communication has been established, it is possible to transmit or receive an audio frequency signal in order to check, for instance, that the established communication is completed. Thus, it is still possible to receive a ringing tone signal during called line ringing. Generators and receivers are sampled in a manner already described in French Patent No. 2,068,046 (U.S. Pat. No. 3,692,961).

FIG. 4 shows a pseudo junctor capable of operating with condition change signalling, that is signalling wherein the condition of the loop connecting the pseudo junctor to the telephone exchange may have for instance five different conditions: high resistance loop, low resistance loop, + to wire $a$ and − to wire $b$, − to wire $a$ and + to wire $b$, and finally potential of + 48 V simultaneously applied to wires $a$ and $b$. Obviously, those five conditions have specific meaning depending on their occurrence either in a communication step or in another one.

In addition, the pseudo junctor shown in FIG. 4 comprises two terminals 69 and 70 respectively connected to wires $b$ and $a$ of the trunk line connecting the pseudo junctor to the exchange. Terminals 69 and 70 are respectively connected to first ends of resistors Z11 and Z12 having their second ends respectively connected to first ends of resistors Z13 and Z14, which in turn have their second ends respectively connected to the windings of relay R5 (350 ohms) serving as loop detecting relay. On the other hand, the junction point between resistors Z11 and Z13 is connected to the first winding of relay R6 (7600 ohms) for detecting polarity changes on wires $a$ and $b$. The junction point between resistors Z12 and Z14 is connected to the second winding of R6 through make contact R8.1. The other ends of the windings of R6 are connected to each other through diode D1 having its forward poled from $a$ to $b$. Other ends of windings of relays R5 are respectively connected to mobile contacts of two reversing switches R11.1 and R11.2. make contacts and resting contacts of those switches are arranged so as to be able to reverse the potentials applied to wires $a$ and $b$ through relay R5. In addition, resting contacts of R11.1 and R11.2 are respectively connected to mobile contacts of two reversing switches R8.1 and R8.3. The resting contact of R8.2 is connected to the cathode of diode D2 and resting contact of R8.3 is connected to the anode of diode D2 and to the make contact of R10.1, whose steady contact is connected to potential +48V source. Make contacts of R8.2 and R8.3 are respectively connected to the two windings of relay R7, via resting contact R9.1 and R9.2. One winding of relay R7 is connected to a potential of −48V, the other being grounded.

In addition, the pseudo junctor shown in FIG. 4 comprises input terminals 71–74 connected to module distributor 29. Inside the pseudo junctor, these terminals connect through inputs of J–K flip-flops 75–78 having their operation outputs respectively connected to windings of relays R8–R11. It also comprises output terminals 79–82 connected to module scanner 30 and, inside the pseudo junctor, to a suitable voltage source through decoupling diodes and individual contacts R6.1, R5.1 and C, C being an operation key.

Finally, the pseudo junctor ensures the connection of wires $a$ and $b$ to tone generators and detectors, via terminal 83 connected to 67, 84 connected to 68, 67 and 68 having the same function as in pseudo junctor shown in FIG. 3.

The five conditions of the pseudo junctor obviously depend on condition of relays R8 - R11 controlled by distributor 29 according to the following combinations:

— high resistor loop: Relays R8 and R9 operated, relays R10 and R11 released,
— low resistor loop: Relay R11 operated, other relays released,
— + on wire $a$ and − on wire $b$: Relay R8 operated, other relays released,
— − on wire $a$ and + on wire $b$: Relays R8 and R11 operated, other relays released,
— + 48 V on wires $a$ and $b$: Relay R10 operated, other relays released.

To be noted, contacts of the various relays are conventionally indicated by the relay numerical reference followed by period and rank number. Also to be noted, make contacts R6.1, R5.1 recopy conditions of relays R6, R5 and R7 and repeat signals toward processing unit 5 through the scanner which allows unit 5 to be informed of the pseudo junctor condition.

FIG. 5 shows a pseudo junctor for communicating with a telephone exchange employing MF signalling. In this case, line signals and register signals have to be considered separately. The diagram shown in FIG. 5 corresponds to circuit processing line signals. The pseudo junctor may have six conditions which correspond to the five already mentioned in relation with FIG. 4 plus an open loop condition. Those six conditions have various meanings, according to the step of the communication under test.

The pseudo junctor shown in FIG. 5 comprises two terminals 85 and 86 respectively connected to wires $b$ and $a$ of the tested point line. Terminal 86 is connected to the anode of a photoelectric diode DP1 operating as a relay, with connection via resistor Z15 (1200 ohms) make contact R12.1 and resistor Z16 (12 kilohms) which may be shunted by make contact R13.1. A second photoelectric diode DP2 is connected in parallel with diode DP1, but poled in the reverse direction. Finally, resistor Z17 (1 kilohm) is connected in parallel with both diodes. The cathode of diode DP1 is connected to mobile contact of reversing switch R14.1 via resistor Z18 (560 ohms). Terminal 85 is connected to the mobile contact of reversing switch R14.2 via resistor Z19 (1200 ohms) and make contact R12.2. Resistor Z20 (560 ohms) is connected in parallel with diodes DP1 and Z18. resting contacts of R14.1 and R14.2 are respectively connected to mobile contacts of reversing switches R15.1 and R15.2. The make contact of R14.1 is connected to input of threshold amplifier 87 via resistor Z21 (270 ohms), while make contact R14.2 is directly connected to input of 87. Resting contact of R15.1 and make contact of R15.2 are grounded. Make contact of R15.1. and resting contact R15.2 are connected to voltage source of — 48 V, via resistor Z22 (270 ohms).

The pseudo junctor shown in FIG. 5 also comprises input terminals 88 – 91 for connecting corresponding outputs of distributor 29 to inputs of J–K flip-flops 92 – 95 which respectively supply relays R12 – R15. As in FIG. 3, between flip-flops and the associated relays, amplifiers may be provided. It also comprises three output terminals 96 to 98 to scanner 30. Terminal 96 is connected from output of amplifier 87. Terminal 97 is connected from the collector of transistor T2. Its base is controlled by diode DP1 as indicated by point EDP1 and its emitter is grounded. The biasing of the collector of transistor T2 is produced by resistor Z23 (2,2 kilohms) connected to a source + V. In addition, terminal 97 is decoupled by capacitor C3 (10 μF). similarly terminal 98 is connected from the collector of transistor T3 controlled by point EDP2 of diode DP2 biased by resistor Z24 and decoupled by capacitor C4.

Finally, the pseudo junctor shown in FIG. 5 ensures the connection from the trunk line to tone generators and receivers. In particular, connections are made to module MF signalling devices, via terminal 99 connected to 67 and terminal 100 connected to 68. Terminals 99 and 100 are decoupled from wires a and b by capacitors. Terminals 67 and 68 have the same function as described in FIGS. 3 and 4.

Obviously the six conditions of the pseudo junctor depend on the conditions of relays R12 to R15 controlled by distributor 29 according to the following combination, the pseudo junctor being either used as an outgoing junctor or an ingoing junctor:

Outgoing junctor - Relay R14 is operated
— loop open: Relay R12 released,
— high resistor loop: Relays R12 and R13 operated,
— low resistor loop: Relay R12 on, R13 released,
— idle condition of associated ingoing junctor is then tested by 87,
— + to wire a and — to wire b: detection by DP1
— — to wire a and + to wire b: detection by DP2;

Ingoing junctor - Relay R14 released and Relay R12 operated,
— + to wire a and — to wire b: Relay R15 released,
— — to wire a and + to wire b: Relay R15 operated,
— DP1 and DP2 detect loop conditions of associated outgoing junctor.

To be noted that for a good operation of the simulator, the signalling devices are preferably of the type described in the above mentioned French Patent Application 72 23 909, wherein threshold detectors and active filters are utilized. That technique is also preferably extended to other detectors, for example, detectors for detecting tones at 425 and 850 Hz.

It is recalled that processing circuit 45 is preferably constituted by a stored program computer particularly comprising a monitor program for processing the cells of memory 44. Such a monitor program comprises three possible actions per cell:

— single word advance on timing register,
— if the timing word content does not overflow, jump to the next cell,
— if the timing word overflows, initiating the step written in the cell and the end of the operation, writing a new step into the cell, then jump to the next cell.

Obviously interrupt procedures of the minotor program are provided in a conventional manner.

By way of example, it will be now indicated how the various steps are performed in the course of the establishment of an outgoing call from a pseudo junctor to a pseudo subscriber circuit. First to be noted is that associated cells corresponding to the calling pseudo junctor and the called pseudo subscriber circuit are determined in advance by a suitable initializing program providing pairings random enough to simulate an actual traffic.

1. Pseudo junctor starting step,
2. Transmission of seizure signal to the junctor of exchange 1 located on the same trunk line,
3. Dialing transmission test
4. Test of dialing tone from 1,
5. Dialing transmission (6 or 7 digits)
6. Pseudo subscriber circuit starting step,
7. Ringing current test in pseudo subscriber circuit,
8. Wait condition step in pseudo circuit,
9. Ringing tone test in pseudo junctor
10. Off-hook operation test in pseudo circuit,
11. No-ringing current test in pseudo circuit,
12. Charging test in pseudo junctor,
13. Wait condition step in pseudo circuit,
14. No-ringing tone test in pseudo junctor
15. Transmission of a tone for controlling continuity by pseudo junctor,
16. Tone reception test in pseudo circuit,
17. Wait operation step in pseudo circuit defining a first portion of conversation duration,
18. End of the first portion of conversation duration in pseudo circuit,
19. Tone transmission stopping in pseudo junctor,
20. Transmission of a tone for controlling continuity by pseudo circuit,
21. Tone reception test in pseudo junctor,
22. Wait condition step in pseudo junctor for defining a second portion of a conversation duration,
23. End of the second portion of conversation duration,
24. Tone transmission stopping in pseudo circuit,
25. Calling on-hook operation step in pseudo junctor,
26. Release signal test in pseudo junctor,
27. Release of pseudo junctor and cell thereof,
28. Busy tone reception test in pseudo circuit,
29. Release of pseudo circuit and cell thereof.

It will be noted that from step 15 to step 24 continuity of either communication direction is tested. Indeed, this is particularly necessary when exchange 1 is a four-wire switching exchange and more particularly when exchange 1 is a time-division electronic switching exchange wherein the two communication directions are completely separated. Still to be noted is that, when using the simulator with a time-division exchange, multiplexers/demultiplexers must be provided which are connected to exchange trunk lines, pseudo junctors being connected to those circuits on none-multiplexed side.

To be noted is that the circuit shown in FIG. 5 may be supplemented by two wires TRON-RON when trunk line is so equipped.

In the case of an outgoing call, it will be for instance assumed that outgoing direction to be tested comprises n trunk lines and n simultaneous calls will be initiated toward that direction either from n pseudo subscriber circuits or n calling pseudo junctors if a transit exchange is involved. In each called pseudo junctor in the called direction, the two last digits of the called number are analyzed to recognize either the pseudo circuit or pseudo junctor which has originated the call. Then, the two concerned cells of memory 44 are paired.

Obviously, pseudo circuits and pseudo junctors are grouped in modules. Programing will be simplified by giving all pseudo circuits or pseudo junctors in a module the same either calling or called condition utilizing the same signalling (either pulsed at 50 Hz or TRON-RON, or condition changes).

While the principles of the present invention have hereabove been described in relation with specific embodiments, it will be understood that the said description have only been made by way of example and does not limit the scope of this invention.

What is claimed is:

1. A telephone call simulator comprising pseudo subscriber circuits respectively connected to telephone exchange subscriber lines, pseudo junctors respectively connected to telephone exchange trunk lines, a plurality of separate test circuits comprising: line condition detectors, tone detectors, line condition generators, tone generators, order distributors, scanners and a data processing unit, said call simulator comprising said pseudo junctors connected to wires prolonging the wires of a trunk line associated with the pseudo junctor, said prolonging wires being connected to the said tone detectors and to said order distributors, data processing means controlling said pseudo junctor and the detectors and distributors connected thereto, signalling detection circuit means and signalling transmission circuit means which are proper for the signalling system used on the one of said trunk line which is under test, the said signalling detection circuit means being connected to said scanners and said signalling transmission circuits being connected directly to said order distributors.

2. A telephone call simulator according to claim 1 and means for transmitting signalling over said trunk line as slaved multifrequency signalling, and means for assembling together at least some of said tone generators and tone detectors to form multifrequency signallers.

3. A telephone call simulator for checking the operation of an automatic telephone exchange by simulating subscribers' calls on test lines endowed with directory numbers and connected to the main distributing frame of the exchange in the same manner as subscribers' lines and by verifying the signals by which the operation of the exchange shows itself on these lines, this arrangement comprising:

a plurality of test lines, a plurality of separate test circuits, including number senders and generators and detectors of tones associated with the test lines to be connected separately to these lines in successive phases of a test call, a pseudo junctor for extending said test lines through a coupling field to said separate test circuits, whereby said pseudo junctors form interfaces between said test lines and said separate test circuits, a cyclic distributor for enabling a connection of these circuits to the successive test lines to be selectively controlled, a cyclic tester for enabling the detector circuits which can be connected to the successive test lines to be tested, and a data processing means programmed to supply control signals for said cyclic distributor and said cyclic tester, a direct access electronic memory incorporating a series of cells assigned in a fixed manner to the test lines and placed in the same sequence as the test lines, each cell containing the directory number of its line and being able to receive, for each test call, related information such as a calling function A for the calling line or a called function R for the called line, and the address of the cell assigned to the other coupled line in the test call and, in the course of each test call, situation information such as phase of the call and duration of the phase, a cyclic explorer for enabling the successive cells of this memory to be explored at the same time as the corresponding test lines are reached by the distributor or the tester, a treatment and control circuit proper for receiving information found in the explored cells and the indications of the tester concerning the corresponding test lines, for sending to the distributor orders for the operation of the appropriate test circuits in connection with these lines and for writing new situation information in the cells explored and in the cells coupled to the explored cells, choosing means for enabling different free test lines to be chosen in view of new test calls and appropriate relation information to be written in the corresponding cells, start means for making test calls on the lines associated with the cells which have received the appropriate relation information, means for transmitting signalling over said trunk line as slaved multifrequency signalling, and means for assembling together at least some of said tone generators and tone detectors to form multifrequency signallers.

* * * * *

UNITED STATES PATENT AND TRADEMARK OFFICE
CERTIFICATE OF CORRECTION

PATENT NO. : 3,952,172
DATED : April 20, 1976
INVENTOR(S) : Corentin Jean Louis Penn, et al.

It is certified that error appears in the above-identified patent and that said Letters Patent are hereby corrected as shown below:

Col. 1, line 46, delete second --each--;

Col. 5, line 37, change "processing" to --and since at the time when the processing of--;

Col. 6, line 67, change "dstributor" to --distributor--;

Col. 7, line 13, change "shunte" to --shunt--;

Col. 7, line 22, delete first --to--;

Col. 7, line 61, after "forward" insert --direction--;

Col. 8, line 1, change "R8.1" to --R8.2--;

Col. 8, line 5, after "to" insert --a +48V--; delete "potential"; delete "+48V";

Col. 10, line 17, change "minotor" to --monitor--;

Signed and Sealed this

Twenty-second Day of March 1977

[SEAL]

Attest:

RUTH C. MASON
*Attesting Officer*

C. MARSHALL DANN
*Commissioner of Patents and Trademarks*